United States Patent
Frey et al.

(10) Patent No.: US 7,827,343 B2
(45) Date of Patent: Nov. 2, 2010

(54) METHOD AND APPARATUS FOR PROVIDING ACCELERATOR SUPPORT IN A BUS PROTOCOL

(75) Inventors: Bradly George Frey, Austin, TX (US); Steven Mark Thurber, Austin, TX (US); Andrew Henry Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 11/858,228

(22) Filed: Sep. 20, 2007

(65) Prior Publication Data

US 2009/0083471 A1 Mar. 26, 2009

(51) Int. Cl.
*G06F 13/36* (2006.01)
*G06F 15/173* (2006.01)

(52) U.S. Cl. .................. 710/306; 709/238; 709/240
(58) Field of Classification Search .............. 710/306; 709/240, 238
See application file for complete search history.

(56) References Cited

U.S. PATENT DOCUMENTS

| | | | | |
|---|---|---|---|---|
| 6,088,753 | A * | 7/2000 | Sheafor et al. | 710/306 |
| 6,128,307 | A * | 10/2000 | Brown | 370/412 |
| 6,173,333 | B1 * | 1/2001 | Jolitz et al. | 709/240 |
| 6,662,254 | B1 * | 12/2003 | Tal et al. | 710/300 |
| 6,704,842 | B1 * | 3/2004 | Janakiraman et al. | 711/141 |
| 6,915,369 | B1 * | 7/2005 | Dao et al. | 710/305 |
| 6,930,689 | B1 * | 8/2005 | Giacalone et al. | 345/502 |
| 7,142,539 | B2 * | 11/2006 | Grinfeld | 370/392 |
| 7,219,183 | B2 | 5/2007 | Pettey et al. | |
| 7,292,539 | B2 * | 11/2007 | Ko et al. | 370/252 |
| 7,386,628 | B1 * | 6/2008 | Hansell et al. | 709/238 |
| 7,543,096 | B2 * | 6/2009 | Davies | 710/268 |
| 7,620,047 | B2 * | 11/2009 | Sandy et al. | 370/392 |
| 2004/0039940 | A1 * | 2/2004 | Cox et al. | 713/201 |
| 2005/0053060 | A1 | 3/2005 | Pettey | |
| 2005/0188102 | A1 * | 8/2005 | Madajczak | 709/238 |
| 2005/0262269 | A1 | 11/2005 | Pike | |
| 2006/0095607 | A1 | 5/2006 | Lim et al. | |
| 2006/0112211 | A1 * | 5/2006 | Sandy et al. | 710/315 |
| 2006/0161707 | A1 * | 7/2006 | Davies et al. | 710/268 |
| 2006/0187925 | A1 * | 8/2006 | Brune et al. | 370/389 |
| 2006/0242333 | A1 * | 10/2006 | Johnsen et al. | 710/30 |
| 2006/0248308 | A1 * | 11/2006 | Wang et al. | 711/173 |
| 2007/0097950 | A1 | 5/2007 | Boyd et al. | |
| 2007/0153907 | A1 * | 7/2007 | Mehta et al. | 375/240.24 |
| 2007/0208898 | A1 * | 9/2007 | Pettey et al. | 710/312 |
| 2008/0109565 | A1 * | 5/2008 | Ajanovic et al. | 710/8 |

OTHER PUBLICATIONS

Jasmin Ajanovic, PCI Express (PCIe) 3.0 Accelerator Features, Aug. 2008.*

* cited by examiner

*Primary Examiner*—Mark Rinehart
*Assistant Examiner*—Christopher A Daley
(74) *Attorney, Agent, or Firm*—David A. Mims; Robert C. Rolnik

(57) ABSTRACT

The present invention provides a method and apparatus for processing a bus protocol packet in order to provide accelerator support. A component receives a bus protocol packet having a requester identifier. The component looks up an agent routing field. The component routes the bus protocol packet to an accelerator agent based on the agent routing field. It processes the bus protocol packet at the accelerator agent based on the agent routing field.

17 Claims, 4 Drawing Sheets

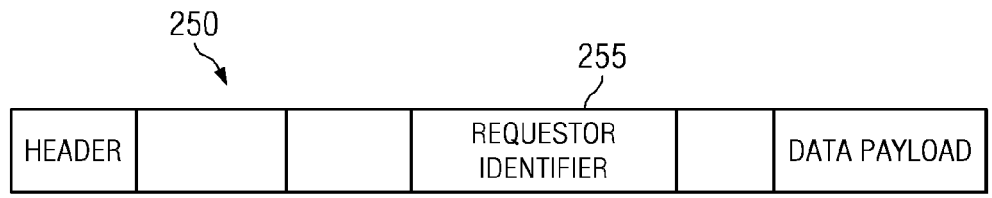

FIG. 4A

| REQUESTOR IDENTIFIER | PACKET TYPE | ACCELERATOR AGENT REQUEST TYPE | |
|---|---|---|---|
| 0x0A01 | ACCELERATOR AGENT | IN-MEMORY-ADD | 421 |
| 0x0B01 | ACCELERATOR AGENT | IN-MEMORY-ADD | |
| 0x0C01 | ACCELERATOR AGENT | IN-MEMORY-ADD | |
| 0x0A02 | ACCELERATOR AGENT | COMPARE-AND-SWAP | 422 |
| 0x0B02 | ACCELERATOR AGENT | COMPARE-AND-SWAP | |
| 0x0C02 | ACCELERATOR AGENT | COMPARE-AND-SWAP | |
| 0x0A03 | ACCELERATOR AGENT | TEST-AND-SET | 423 |
| 0x0B03 | ACCELERATOR AGENT | TEST-AND-SET | |
| 0x0C03 | ACCELERATOR AGENT | TEST-AND-SET | 415 |
| 0x0A04 | OTHER | NON-ACCELERATOR-AGENT OPERATION | |
| 0x0B04 | OTHER | NON-ACCELERATOR-AGENT OPERATION | |

FIG. 4B

METHOD AND APPARATUS FOR PROVIDING ACCELERATOR SUPPORT IN A BUS PROTOCOL

BACKGROUND OF THE INVENTION

1. Field of the Invention

The present invention relates generally to a method and apparatus for communicating between components in a data processing system. More specifically, the invention relates to a method and apparatus to transport accelerator agent requests to an accelerator agent.

2. Description of the Related Art

A data processing system may be configurable to suit the specific needs of a user. A data processing system is built from components. Components are permanently bonded to a motherboard, plugged into the motherboard, or are entities within a bonded or plugged part. Components herein are logical entities that are connected by some sort of interconnecting signals such as a CPU bus, I/O bus, I/O link, or the like, but are not necessarily bounded by their physical packaging. These logical entities are designed to execute some particular task, or if a task is received that is not to be processed by the component, to pass the request on the next interconnect on its way to a component that can process the request. Examples of a component include a core within a CPU module, an arithmetic unit within the CPU core, or an entity responsible for performing a request from an accelerator component. Components that may be added to an I/O card adapter slot generally use the mechanical and electrical characteristics specified by the peripheral component interconnect (PCI) standard, and its variants, for example, peripheral component interconnect express (PCIe). In a typical data processing system, the operating system queries all PCI buses at startup time to determine which devices are present. A device is in the form of a circuit board or card that engages a slot according to well known electrical and mechanical standards. The operating system may also determine any dependencies of a device on data processing system resources. Such resources may include memory, interrupt lines, etc. Next, the operating system allocates the resources and configures each device to operate with allocated resources. The PCI configuration space of a device or memory internal to the device also contains a device type information. An operating system may select device drivers based on the device type information or at least request additional instructions from a user based on the device type information. Part of the data stored in the PCI configuration space is a human readable text description of the device.

A conventional data processing system may include an input/output (I/O) device coupled to a main processor and a memory via and I/O bus or link, for example as specified by the peripheral component interconnect express (PCIe) specification. Such a data processing system may include an accelerator coupled to the I/O bus. The accelerator may be a special processor adapted to perform one or more specific functions. However, the buses in a data processing system may only be adapted to process read and/or write commands as may be sent by the accelerator. Consequently, the buses and interfacing circuitry of PCI cards are not adapted to direct more complex commands to the component that can perform the desired command. For example, components and accelerators of the prior art may not support read-modify-write commands. Such commands, if available, could be used to synchronize the accelerator and main processor so that the accelerator and main processor may efficiently execute different functions of a program. Accordingly, data processing throughput could be improved with a way to dispatch accelerator requests or commands to accelerator agents.

SUMMARY OF THE INVENTION

The present invention provides a method and apparatus for processing a bus protocol packet in order to provide accelerator support. A component receives a bus protocol packet having a requester identifier. The component looks up an agent routing field. The component routes the bus protocol packet to an accelerator agent based on the agent routing field. It processes the bus protocol packet at the accelerator agent based on the agent routing field.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A shows an I/O bus packet in accordance with an illustrative embodiment of the invention;

FIG. 4B is a table used for routing an I/O bus packet as an accelerator agent request based on a requester identifier in accordance with an illustrative embodiment of the invention.

DETAILED DESCRIPTION OF THE PREFERRED EMBODIMENT

Illustrative embodiments of the invention provide a method and apparatus such that a bus employing such a protocol allows the routing of an I/O bus packet from an accelerator on the I/O bus to an accelerator agent that can process the request. For example, the present invention may modify the I/O bus protocol to include a new accelerator agent (AA) request type corresponding to a read-modify-write command so a bus employing the protocol may recognize to what accelerator agent to route that command for processing. By distributing the accelerator agents throughout the system, the accelerator agents can be efficiently located in the component or components where efficiencies of implementation and operation may be obtained. Distributing the accelerator agents throughout the system requires a way to get the requests to the proper place, as presented herein. Aspects of the invention permit distributing accelerator agents throughout the data processing system and provide a communication protocol for routing accelerator agent requests. Consequently, coherent access to memory by various accelerator agent components may be possible. Other features and functions of the embodiments will be apparent from the following description.

Figure 1:
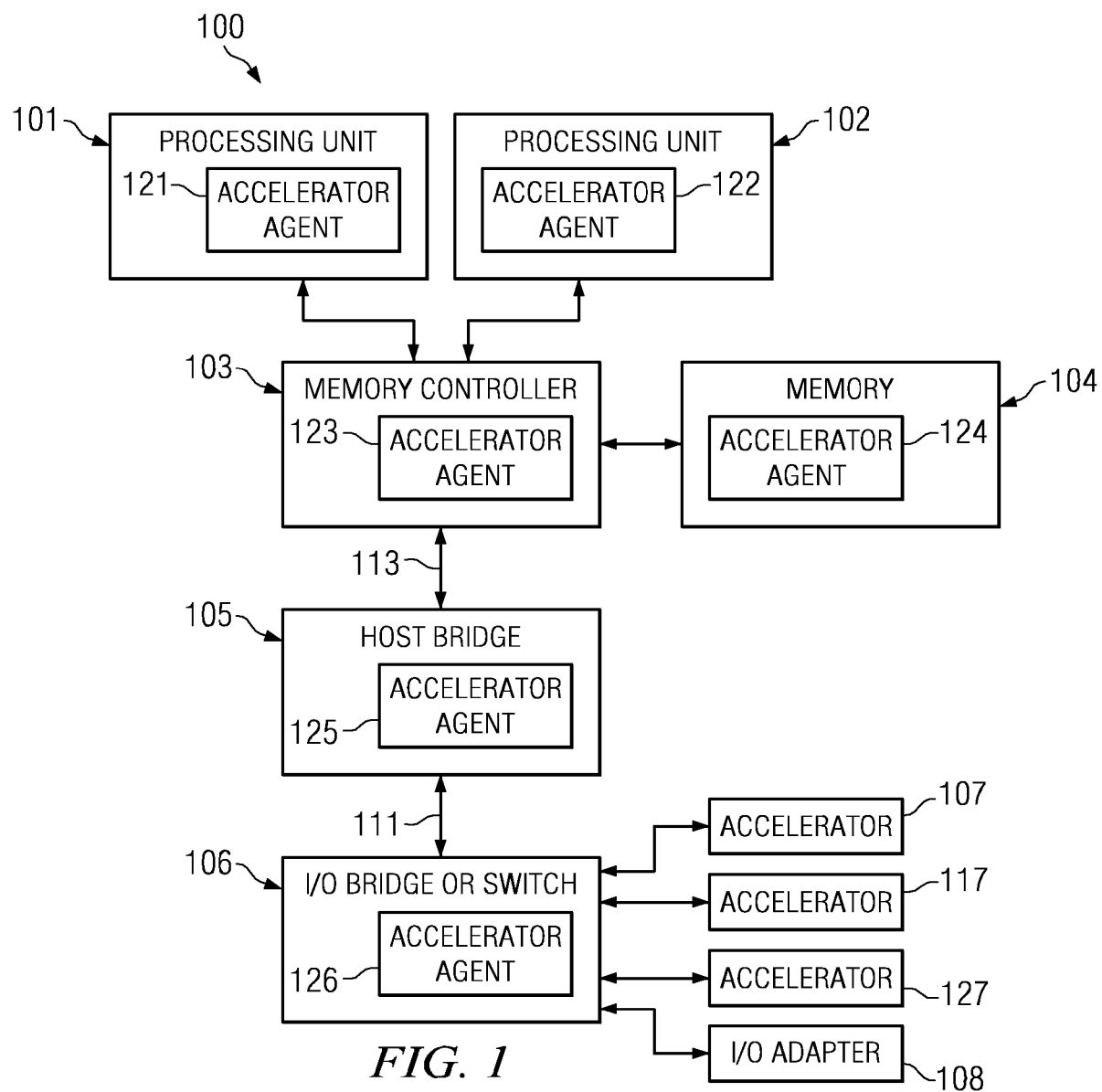
FIG. 1 is a block diagram of a data processing system with a plurality of accelerators and a plurality of accelerator agents in accordance with an illustrative embodiment of the invention.

FIG. 1 is a block diagram of a data processing system with a plurality of accelerators and a plurality of accelerator agents in accordance with an embodiment of the present invention. Data processing system 100 consists of processing units 101, 102, and memory controller 103. The memory controller attaches the processing units and input/output (I/O) features to memory 104, and host bridge 105. The host bridge generates I/O bus 111 from system bus 113. An I/O bus may be, for example, a PCI bus or a PCIe link. I/O bridge or switch 106 coordinates interconnect of at least one I/O adapter 108 and accelerator 107 to I/O bus 111. Accelerators 117 and 127 can offload some processing from accelerator 107.

Support and additional functionality for the data processing system may be accomplished by adding modular units to the data processing system. Additional processing speed for the data processing system may be accomplished by adding one or more accelerators to open slots in a bus. Accelerator 107 may be used to perform subordinate tasks of a processing unit. The accelerator may be, for example, a cell processor according to the Cell Broadband Engine Architecture (CBEA). Other accelerators may include graphics accelerators. The I/O buses or links between the I/O components can be one of several types of buses or links. The I/O buses may be, for example, PCI specification buses, PCIe specification links, or the like. In order to support overall throughput of the data processing system, an accelerator communicates with accelerator agents of other components by using a bus protocol packet. A bus protocol packet is a sequence of bits transmitted across a bus according to a format that supports a sending component and a receiving component attached to one or more busses. An example of a bus protocol packet is a Transaction Layer Packet (TLP) of the PCIe specification.

An accelerator agent is a logical unit that is designed to process requests from an accelerator in accordance with the type of request. If the type of request is one that requires a response, the accelerator agent returns results to the accelerator. Each component in the system may contain an accelerator agent. Processing units 101 and 102 have accelerator agent 121 and accelerator agent 122, respectively. Memory 104 includes accelerator agent 124. Similarly, host bridge 105 hosts accelerator agent 125.

An example of an accelerator agent is an in-memory-add agent. The in-memory-add agent is an accelerator agent resident within a memory or memory controller, though the in-memory-add agent may be located in other components. The in-memory-add agent accepts an I/O bus packet having the accelerator agent request type. The in-memory-add agent adds the contents of the data payload in the I/O bus packet to a memory location whose address is also contained in the request packet. The memory resident accelerator agent 124 or memory controller resident accelerator agent 123 performs the addition as an atomic operation without interruption by any of the other processors or accelerators in data processing system 100.

Another example of an accelerator agent is a test-and-set circuit. A test-and-set circuit may be any suitable hardware, firmware, or combination thereof that tests and conditionally writes to a memory location atomically, that is, without interruption. Operated as an accelerator agent, a test-and-set circuit may be addressed via a bus protocol packet, such as a packet on an I/O bus. The operation of the test-and-set circuit is atomic.

Still another example of an accelerator agent is a compare-and-swap circuit. A compare-and-swap circuit may any suitable hardware, firmware, or combination thereof that compares memory addressed by a first operand in the request to a second operand in the request, and based on an equivalence between the memory addressed by the first operand and second operand, the circuit modifies the memory addressed by the first operand. The circuit replaces the memory with a third operand in the request. With the added feature of the accelerator agent, the compare-and-swap circuit may be addressed via a bus protocol packet, such as a packet on an I/O bus. The operation of the compare-and-swap circuit is atomic.

Figure 2:
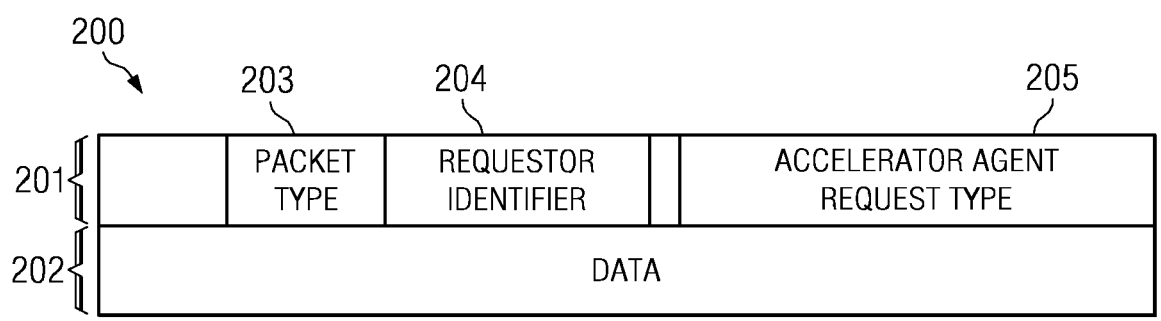
FIG. 2 shows an I/O bus packet in accordance with an illustrative embodiment of the invention.

FIG. 2 shows an I/O bus packet in accordance with an illustrative embodiment of the invention. Packet 200 comprises header 201 which contains the requestor identifier 204. Additional fields of packet header 201 may include packet type 203 and accelerator agent request type 205. A requestor identifier is a binary coded field that uniquely identifies the accelerator that transmitted the bus protocol packet. An accelerator agent request type is a predetermined bit field placed in a reserved location of a bus protocol packet. The location may be reserved by consensus among manufacturers. Packet type 203 provides the data processing system with the purpose of the packet. For example, an I/O bus packet that extends a PCI packet protocol may apply a predetermined bit field or decode to the packet type. A component or an accelerator agent that reads the predetermined bit field may recognize the packet as an accelerator agent packet type based on packet type 203. The predetermined bit field may be accepted by convention or standardization among manufacturers of PCI or PCIe revised bus standards.

As an example of the I/O bus packet described above, binary 0 1101 may operate as a predetermined bit field that identifies an I/O bus packet as an accelerator agent request. Such a predetermined bit field may be placed in a PCI bit field, for example, the type bit field. The type bit field occupies the 5 least significant bits of the 0 byte of a PCI packet. A PCI bit field is any field defined by the PCI or PCIe specifications. A packet type is a determination of a packet's purpose to be either an accelerator agent request or a non-accelerator-agent request. The non-accelerator-agent request is a request specified in a current PCI bus protocol. In this example, an extended PCI bus protocol may place the bit field in the five least significant bits of the first byte of a transaction layer packet (TLP). Consequently, a component or an accelerator agent may determine that packet type 203 field contains the decode standardized to identify the packet as an accelerator agent packet type. A component or an accelerator agent may then read accelerator agent request type 205 to identify which accelerator agent is the destination accelerator agent. The accelerator agents include, for example, compare-and-swap, test-and-set, and in-memory-add circuits or accelerator agents as described above. Further information of accelerator agent request type 205 may identify a subclass of operations to be performed by the destination accelerator agent. For example, for a PCIe extended embodiment, the accelerator agent request type 205 can be located at the same bit offset into packet 200 that is occupied within a PCIe packet byte enable decode fields. Packet 200 may be according to the PCIe specification PCI Express™ Base Specification, Revision 1.1, PCI Special Interest Group (hereinafter "PCI Express Specification"), which is herein incorporated by reference. PCI Express is a trademark of PCI Special Interest Group, in the United States.

As described above, packet 200 is an extension of the PCI and/or PCIe I/O bus packet protocols. However, additional embodiments may form and interpret an I/O bus packet according to an alternative I/O bus packet protocol. For example, an alternative embodiment packet may be comprised of a requestor identifier with or without additional data or fields.

Various alternative I/O bus packets may permit routing a bus packet in accordance with illustrative embodiments of the invention. In each case, an agent routing field is located and used to identify a target or destination accelerator agent. An agent routing field is an identifier of the accelerator agent within the data processing system to which the packet is addressed. Consequently, the agent routing field may be a destination accelerator agent. The accelerator agent request type may define the agent routing field with the predetermined bit field. This aspect is put to use in the flowchart shown in FIG. 3 below. Alternatively, an accelerator agent request type may be looked up in a table based on a requestor identifier. This aspect is illustrated with respect to FIGS. 4A and 4B below. Each form of the agent routing field, as well as each method for processing it, will be discussed further below.

Figure 3:
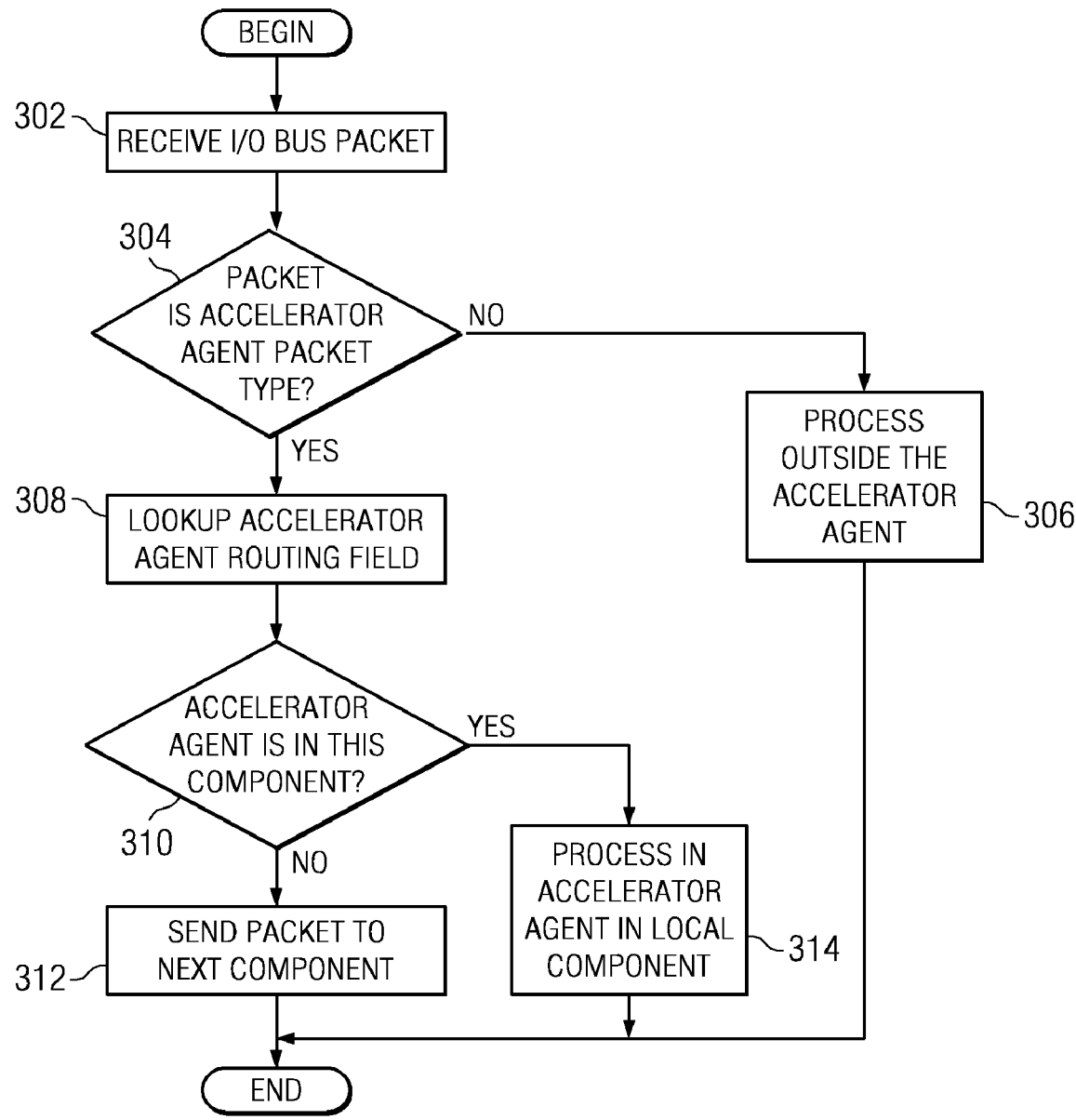
FIG. 3 is a flowchart for routing of a packet having an acceleration agent (AA) request in accordance with an illustrative embodiment of the invention.

A first method for handling agent routing fields and thus bus routing packets is described in FIG. 3. FIG. 3 is a flowchart for routing of a packet having an accelerator agent request in accordance with an illustrative embodiment of the invention. The packet may be packet 200 of FIG. 2. Initially, a component receives an I/O bus packet by a component (step 302). Next, the component determines whether the packet is an accelerator agent packet type (step 304). A negative result causes the component to pass the packet to non-accelerator-agent circuit for processing outside of the accelerator agent (step 306). A non-accelerator-agent circuit is a circuit that is located outside an accelerator agent. Nevertheless, a non-accelerator-agent may exist in a common integrated circuit with the accelerator agent and respond to signals from the accelerator agent. A non-accelerator-agent circuit supports non-accelerator-agent processing. A non-accelerator-agent processing includes, for example, processing of a completion for a memory write (MWr) packet. Many conventional format and type field encodings are known in the art for the PCI protocol. A non-accelerator-agent packet is a packet using any conventional format and field type. In the example given above for the memory write, the format and type fields can comprise bits set to binary 10, and binary 00000, respectively. Accordingly, such a packet is handled by non-accelerator-agent processing.

A positive result to step 304 causes the component to read the accelerator agent request type (step 308). The accelerator agent request type is a type of agent routing field. The component determines if the accelerator agent is the routing target of the packet (step 310). In other words, the component determines if the accelerator agent is in the component based on accelerator agent request type 205 of FIG. 2. A routing target is a component selected by an accelerator and identified, directly or indirectly, by the I/O bus packet. A negative result to step 310 causes the component to forward the I/O packet to the next component in the chain (step 312). Otherwise, the packet is processed by the accelerator agent in the current component (step 314). Processing terminates thereafter.

An example of the handling of an accelerator request can illustrate the handling of an I/O packet in FIG. 3. In this example, accelerator 107 of FIG. 1 sends an I/O packet to I/O bridge or switch 106. The packet can be set with packet type of 0 1101, an example of a predetermined field to indicate an accelerator agent request. I/O bridge or switch 106 receives the I/O packet. It determines that the I/O packet is an accelerator agent request packet type. The I/O bridge or switch looks up the accelerator agent routing field, in this case, accelerator agent request type 205 of FIG. 2. Next, I/O bridge or switch 106 determines that the accelerator agent addressed by the accelerator agent request type is not accelerator agent 126. The I/O bridge or switch sends the packet to the next component, in this case, host bridge 105.

Host bridge 105 performs similar operations as conducted on I/O bridge or switch 106. The host bridge also determines that the accelerator agent 125 is not the destination identified by the accelerator agent request type 205. The next component is memory controller 103. Memory controller 103 performs similar operations and passes the operation on to the memory 104.

The memory component 104 executes the steps of FIG. 3. When step 310 is executed, memory 104 determines that it is accelerator agent 124 being addressed by the accelerator agent request type. Accelerator agent 124 performs the in-memory-add. The accelerator adds bits to a memory location. For example, a memory location 0x1234ABCD can be addressed by using data 202 of packet 200 (see FIG. 2) to specify the memory location.

Figure 4C:
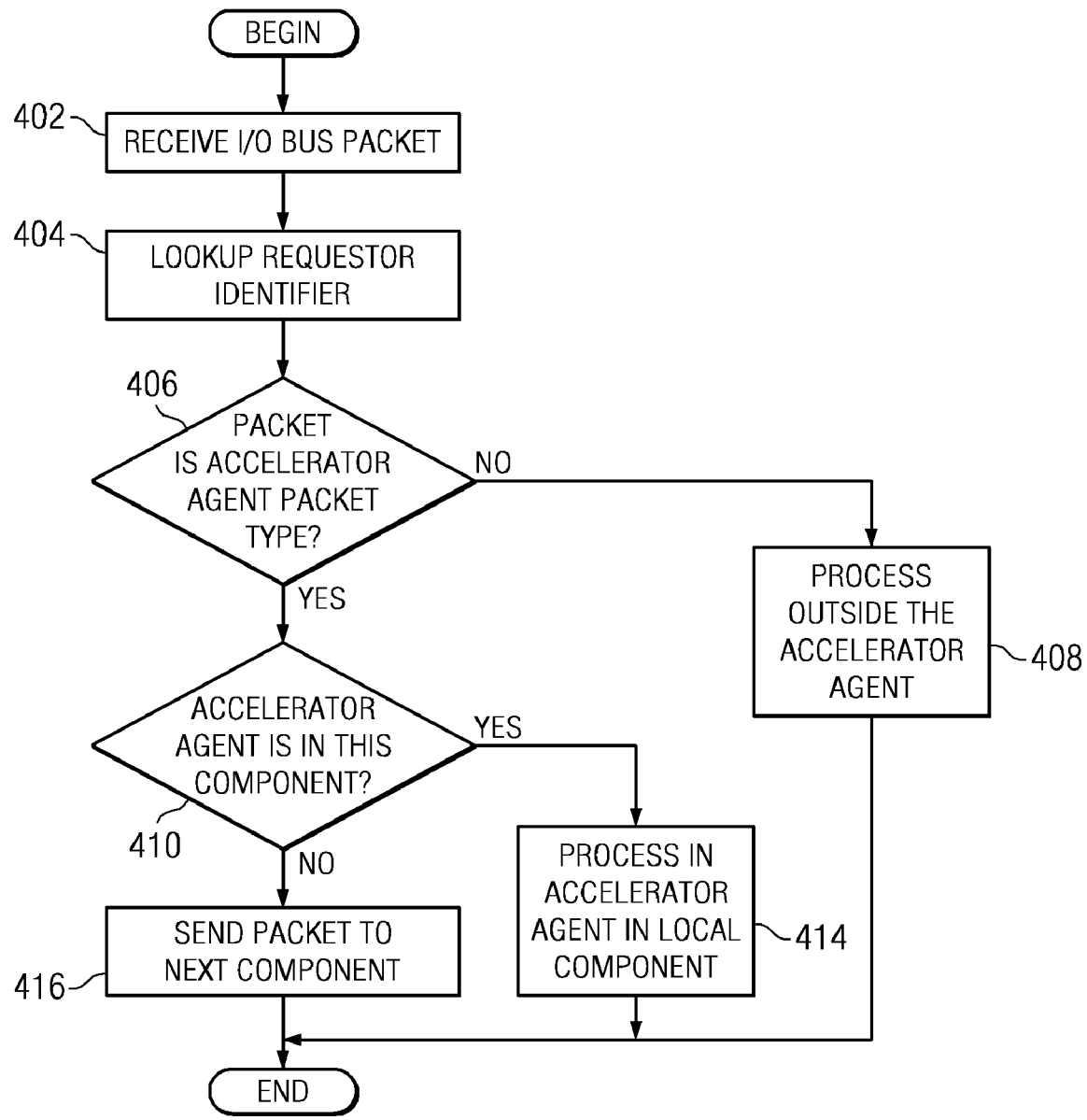
FIG. 4C is a flowchart for routing an I/O bus packet as an accelerator agent request based on a requester identifier in accordance with an illustrative embodiment of the invention.

A second method for handling agent routing fields, and thus bus routing packets, is described in FIGS. 4A-C. FIG. 4A is an example of packet 250 according to the PCI bus protocol. Packet 250 may be according to a PCI standard, as is known in the art. Accordingly, packet 250 includes requestor identifier 255. Requestor identifier 255 may be of an identical form as requestor identifier 204 of FIG. 2. Nevertheless, packet 250 may vary from packet 200 of FIG. 2 in the number of fields allocated to support routing.

FIG. 4B is a table that may be used to lookup routing information corresponding to a requester identifier in accordance with an alternative illustrative embodiment of the invention. Table 400 is comprised of rows. Row 411 contains an entry for requestor identifier 401, packet type 403 and accelerator agent request type 405. Each row entry for the requestor identifier has a packet type. In this case, the requestor identifier of first row 411 is requestor identifier, 0x0A01, which may uniquely identify accelerator 107 of FIG. 1. The requester identifier, 0x0A01, uniquely identifies accelerator 107 because 0x0A01 identifies no other accelerator of data processing system 100. Additional requestor identifiers couple the accelerator 107 to additional accelerator agents. In row 412 requestor identifier, 0x0A02, couples accelerator 107 to the compare-and-swap 422. Similarly, in row 413 requester identifier, 0x0A03, couples accelerator 107 to test-and set 423. Additional accelerators, for example, accelerator 127 may be coupled to test-and-set 415 through requestor identifier, 0x0C03, row 425.

The table's storage format for the packet type may use a binary one to identify an accelerator agent request packet type and a binary zero to identify other requests such as those in the present PCI and PCIe standards. The table may be populated during data processing system startup for each accelerator agent. Accelerator agents using table 400 may avoid writing and transmitting packets that vary from existing I/O packet formats of the prior art. Consequently, embodiments implemented according to FIG. 4B may be backwards compatible with data processing systems that use PCIe I/O bus packets known in the art.

FIG. 4C is a flowchart for routing an I/O bus packet as an accelerator agent request based on a requestor identifier in accordance with an illustrative embodiment of the invention. The flowchart provides a method for handling an I/O bus packet without resorting to adding a specialty packet type or accelerator agent request type field to the I/O bus packet. Instead, the component may rely on an available table such as table 400. Initially, a component receives an I/O bus packet (step 402). The component uses a requester identifier of the I/O bus packet to lookup information in table 400 (step 404). A non-accelerator-agent packet type corresponds to packets that are not accelerator agent commands. The component determines if the packet is an accelerator agent packet type (step 406). The component may make the determination based on looking up a stored value that matches the predetermined scheme for identifying the I/O bus packet as an accelerator agent command. A negative determination to step 406 causes the component to perform non-accelerator-agent processing (step 408).

An accelerator agent request may be a field in each row. Such a field may include an identifier that uniquely identifies the accelerator agent within the data processing system, for example, data processing system 100 of FIG. 1. In addition, because each accelerator agent may be specialized to perform a single atomic operation (steps 314 and 414), a component may host multiple accelerator agents.

Returning to FIG. 4, a positive determination to step 406 causes the component to determine if it is the routing target of the packet (step 410). The component determines the packet status based on whether the table entry or field for the accelerator agent request type identifies the local component as the destination accelerator agent (step 410). A negative result to step 410 causes the component to forward the I/O bus packet to the next component in the chain (step 416). Otherwise, the packet is processed by the accelerator agent in the current component (step 414). Accordingly, an in-memory-add command is a packet routed to a component hosting an in-memory-add accelerator agent. Such a packet is matched to a table entry having in-memory-add 421. A compare-and-swap command is a packet routed to a component hosting a compare-and-swap accelerator agent. Such a packet is matched to a table entry having compare-and-swap 422. A test-and-set command is a packet routed to a component hosting a test-and-set accelerator agent. Such a packet is matched to a table entry having test-and-set 423. Processing terminates thereafter.

Thus, one or more illustrative embodiments of the invention provide a way to perform in-memory-add operations, test-and-set operations and compare-and-swap operations on a device other than a requesting device. It is appreciated that the operations are provided here by way of example. Additional operations may be performed by still other forms of accelerator agents. Intermediate devices on an I/O bus may examine and forward a packet to subsequent devices on the I/O bus and elsewhere in the data processing system. Consequently, circuits as described above may synchronize the accelerator and main processor so the accelerator and main processor may efficiently execute program functions.

The invention can take the form of an entirely hardware embodiment, an entirely software embodiment or an embodiment containing both hardware and software elements. In a preferred embodiment, the invention is implemented in hardware.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing a bus protocol packet in order to provide accelerator support comprising:
   receiving on a parallel bus of at least thirty-two conductors a bus protocol packet having a requestor identifier, wherein the bus protocol packet comprises a compare-and-swap command for which a destination accelerator agent is configured to execute atomically looking up an agent routing field based on the bus protocol packet, wherein looking up the agent routing field comprises:
   determining that the agent routing field does not identify a local component; and
   responsive to a determination that the agent routing field does not identify a local component, forwarding the bus protocol packet to a next component, wherein the agent routing field is an identifier of the destination accelerator agent;
   routing the bus protocol packet to an accelerator agent based on the agent routing field; and
   processing the bus protocol packet at the accelerator agent based on the agent routing field.

2. The method of claim 1, wherein the agent routing field comprises an accelerator agent request type.

3. The method of claim 2, wherein the step of routing further comprises obtaining a routing target within the accelerator agent request type.

4. The method of claim 3, wherein the step of routing further comprises looking up a routing target based on the accelerator agent request type.

5. The method of claim 4, wherein the step of looking up the agent routing field is based on a packet type, wherein the packet type is a field in a peripheral component interconnect bit field.

6. The method of claim 1, wherein the agent routing field is based on the requestor identifier.

7. The method of claim 6, further comprising:
determining whether the bus protocol packet is an accelerator agent request, wherein the step of looking up the agent routing field within a table is based on the requestor identifier and is responsive to a determination that the bus protocol packet is an accelerator agent request.

8. The method of claim 7, wherein routing comprises routing the bus protocol packet to an accelerator agent that determines equivalence between a memory addressed by a first operand and a second operand, and responsive to the determination of equivalence by the accelerator agent, the accelerator agent modifying the memory addressed by the first operand by replacing the memory with a second operand.

9. The method of claim 8, further comprising:
populating the table with a packet type and an accelerator agent request type corresponding to the requestor identifier.

10. An apparatus for processing a bus protocol packet in order to provide accelerator support comprising:
a receiving means for receiving on a parallel bus of at least thirty-two conductors a bus protocol packet having a requestor identifier, wherein the bus protocol packet comprises an in-memory-add command for which a destination accelerator agent is configured to execute;
a looking up means for looking up an agent routing field based on an accelerator agent request type, wherein the agent routing field is an identifier of the destination accelerator agent;
a routing means for routing the bus protocol packet to an accelerator agent based on the agent routing field; and
a processing means for processing the bus protocol packet at the accelerator agent based on the agent routing field, wherein the looking up means for looking up an agent routing field comprises determining that the agent routing field does not identify a local component; and responsive to a determination that the agent routing field does not identify a local component, forwarding the bus protocol packet to a next component.

11. The apparatus of claim 10, wherein the means for routing further comprises obtaining a routing target within the accelerator agent request type.

12. The apparatus of claim 11, wherein the means for routing further comprises looking up a routing target based on the accelerator agent request type.

13. The apparatus of claim 12, wherein the looking up means for looking up an agent routing field looks up the agent routing field based on a packet type, wherein the packet type is a field in a peripheral component interconnect bit field.

14. The apparatus of claim 10, wherein the agent routing field is based on the requestor identifier.

15. The apparatus of claim 14, further comprising:
a determining means for determining whether the bus protocol packet is an accelerator agent request, wherein the looking up means for looking up the agent routing field within a table looks up based on the requestor identifier and is responsive to a determination that the bus protocol packet is an accelerator agent request.

16. The apparatus of claim 15, wherein the routing means comprises means for routing the bus protocol packet to an accelerator agent that adds contents of a data payload to a memory location in the data payload.

17. The apparatus of claim 16, further comprising:
populating means for populating the table with a packet type and an accelerator agent request type corresponding to the requestor identifier.

* * * * *